(12) United States Patent
Kameyama et al.

(10) Patent No.: US 8,507,573 B2
(45) Date of Patent: Aug. 13, 2013

(54) ACTIVE ENERGY RAY CURABLE INKJET INK COMPOSITION

(75) Inventors: Yuji Kameyama, Tokyo (JP); Norio Suzuki, Tokyo (JP); Yohei Konda, Tokyo (JP); Kazuhiro Jonai, Tokyo (JP)

(73) Assignees: Toyo Ink SC Holdings Co., Ltd., Tokyo (JP); Toyo Ink Co., Ltd., Tokyo (JP)

( * ) Notice: Subject to any disclaimer, the term of this patent is extended or adjusted under 35 U.S.C. 154(b) by 170 days.

(21) Appl. No.: 13/171,938

(22) Filed: Jun. 29, 2011

(65) Prior Publication Data

US 2012/0003435 A1 Jan. 5, 2012

(30) Foreign Application Priority Data

Jun. 30, 2010 (JP) ................ P2010-149642

(51) Int. Cl.
*C09D 11/12* (2006.01)
(52) U.S. Cl.
USPC .............................. 522/56; 522/27; 522/186
(58) Field of Classification Search
USPC ............................................ 522/27, 56, 186
See application file for complete search history.

(56) References Cited

U.S. PATENT DOCUMENTS

| | | |
|---|---|---|
| 2005/0155522 A1 | 7/2005 | Wang et al. |
| 2007/0182786 A1 | 8/2007 | Nakamura |
| 2007/0211111 A1 | 9/2007 | Hayata |
| 2009/0247672 A1 | 10/2009 | Hanawa |
| 2010/0279080 A1 | 11/2010 | Morgan et al. |

FOREIGN PATENT DOCUMENTS

| | | |
|---|---|---|
| EP | 1 815 978 A1 | 8/2007 |
| EP | 1 829 680 A1 | 9/2007 |
| EP | 2 105 480 A1 | 9/2009 |
| JP | 2005-144790 | 6/2005 |
| JP | 2007-231232 | 9/2007 |
| JP | 2007-262218 | 10/2007 |
| JP | 2008-189887 | 8/2008 |
| WO | WO 2008/139188 A1 | 11/2008 |

OTHER PUBLICATIONS

U.S. Appl. No. 13/434,195, filed Mar. 29, 2012, Suzuki, et al.
Extended European Search Report issued Oct. 18, 2011, in European Patent Application No. 11171976.1.

*Primary Examiner* — Vu A Nguyen
(74) *Attorney, Agent, or Firm* — Oblon, Spivak, McClelland, Maier & Neustadt, L.L.P.

(57) ABSTRACT

There is provided an inkjet ink which has satisfactory storage stability and inkjet ejection stability, exhibits excellent curability, and is capable of forming high quality images on coated paper by an inkjet system. Disclosed is an active energy ray curable inkjet ink composition comprising: 15-75% by weight of at least one polymerizable bifunctional monomer selected from the group consisting of dipropylene glycol diacrylate and 1,9-nonanediol diacrylate; and 1% by weight to 10% by weight of [4-(methylphenylthio)phenyl] phenylmethanone as a photopolymerization initiator.

6 Claims, No Drawings

ACTIVE ENERGY RAY CURABLE INKJET INK COMPOSITION

TECHNICAL FIELD

The disclosure relates to an active energy ray curable inkjet ink composition.

BACKGROUND

Active energy ray curable compositions have been hitherto supplied and used for offset printing, silk screen processing, overcoat agents and the like. In recent years, the amount of use of the active energy ray curable compositions is ever increasing due to the advantages such as cost reduction as a result of simplification of the drying process, and reduction of the volatilization volume of the solvent in coping with environmental problems. Among others, water-based compositions and solvent-based compositions are extensively used as inkjet inks, and these compositions can be used appropriately for different applications in accordance with the characteristics of the respective compositions. However, these water-based and solvent-based compositions have problems such as limitations on the receptor base material in industrial use, relatively poor water resistance, a need for a large amount of energy for the drying of the ink, and adhesion of the ink components to the head as a result of drying. Therefore, it is expected that the ink compositions be replaced with active energy ray curable inks having relatively low volatility.

Active energy ray curable inks are expected to be able to cope with various base materials. However, in reality, the extent of dot spread of the ink varies according to the difference between the surface tension of the base material and the surface tension of the ink, so that it is difficult to obtain satisfactory image quality equally with all base materials. Particularly, absorbing media such as paper are prone to have vertical penetration, and dot spread does not easily occur in the absorbing media as compared with non-absorbing media.

Patent Document 1 discloses that printing is performed using a UV ink by an inkjet method on a coated paper, but a cationic type inkjet ink is used. Furthermore, this technology suggests a gesture of suppressing dot spread, so that it is difficult to obtain satisfactory image quality when images are printed.

Patent Document 2 discloses the use of dipropylene glycol which exhibits satisfactory spread on coated paper. However, a hydrogen-withdrawing type initiator is not used, and highlighted parts are not cured.

Patent Document 3 discloses the use of dipropylene glycol and a hydrogen-withdrawing type initiator. However, the amount of dipropylene glycol is small, and sufficient spread does not occur in coated paper. Furthermore, benzophenone is used as the hydrogen-withdrawing type initiator, but benzophenone has strong light absorption in the shorter wavelength region and is likely to cause curing defects such as surface wrinkles.

Patent Document 4 discloses the use of 1,9-nonanediol diacrylate which exhibits satisfactory spread on coated paper. However, as in the case of Patent Document 3, benzophenone is used as a hydrogen-withdrawing type initiator, and curing defects are prone to occur.

Patent Document 1: Japanese Patent Application Laid-Open (JP-A) No. 2005-144790
Patent Document 2: JP-A No. 2007-262218
Patent Document 3: JP-A No. 2008-189887
Patent Document 4: JP-A No. 2007-231232

SUMMARY

An object of the present invention is to provide an active energy ray curable inkjet ink composition which has excellent storage stability and high inkjet ejection stability, forms satisfactory images on coated paper, and exhibits excellent curability.

According to one aspect of the present invention, there is provided an active energy ray curable inkjet ink composition comprising: 15-75% by weight of at least one polymerizable bifunctional monomer selected from the group consisting of dipropylene glycol diacrylate and 1,9-nonanediol diacrylate; and 1 to 10% by weight of [4-(methylphenylthio)phenyl]phenylmethanone as a photo polymerization initiator.

The disclosure of the present specification relates to the subject matter of Japanese Patent Application No. 2010-149642 (filed on Jun. 30, 2010), the entire disclosure of which has been incorporated herein by reference.

DETAILED DESCRIPTION

According to one embodiment of the present invention, there is provided an active energy ray curable inkjet ink composition comprising: 15% by weight to 75% by weight of at least one polymerizable bifunctional monomer selected from the group consisting of dipropylene glycol diacrylate and 1,9-nonanediol diacrylate; and 1% by weight to 10% by weight of [4-(methylphenylthio)phenyl]phenylmethanone as a photopolymerization initiator.

According to the embodiment, the ink composition forms satisfactory images by inkjet printing on various coated papers having different surface states, and exhibits excellent curability.

The ink composition contains at least dipropylene glycol diacrylate and/or 1,9-nonanediol diacrylate as a polymerizable bifunctional monomer(s) in the ink. Although the principle is not clearly understood, the ink composition thereby exhibits satisfactory ink spread on coated paper.

The total content of dipropylene glycol diacrylate and 1,9-nonanediol diacrylate in the ink composition is 15% by weight to 75% by weight, and preferably 30% by weight to 60% by weight. If the total content is less than 15% by weight, excellent ink spread is not exhibited on coated paper, and if the total content is greater than 75% by weight, the effect of curing shrinkage increases, so that the adhesiveness to coated paper is deteriorated. Furthermore, when the compounds are contained in an amount of 30% by weight or more, ink spread is further improved, and when the content is 60% by weight or less, adhesiveness is further improved.

The ink composition may also contain bifunctional and/or polyfunctional monomers if necessary, in addition to dipropylene glycol diacrylate and/or 1,9-nonanediol diacrylate.

Examples of the bifunctional and polyfunctional monomers include, but are not limited to, ethylene glycol di(meth)acrylate, diethylene glycol di(meth)acrylate, polyethylene glycol di(meth)acrylate, 1,6-hexanediol di(meth)acrylate, ethoxylated 1,6-hexanediol diacrylate, neopentyl glycol di(meth)acrylate, polypropylene glycol diacrylate, 1,4-butanediol di(meth)acrylate, tetraethylene glycol diacrylate, 2-n-butyl-2-ethyl-1,3-propanediol diacrylate, hydroxypivalic acid neopentyl glycol diacrylate, 1,3-butylene glycol di(meth)acrylate, tripropylene glycol diacrylate, ethoxylated tripropylene glycol diacrylate, neopentyl glycol-modified trimethylolpropane diacrylate, stearic acid-modified pentaerythritol diacrylate, neopentyl glycol oligoacrylate, 1,4-butanediol oligoacrylate, 1,6-hexanediol oligoacrylate, ethoxylated neopentyl glycol di(meth)acrylate, propoxylated neopentyl glycol di(meth)acrylate, tripropylene glycol di(meth)acrylate, bisphenol A diacrylate, dimethyloltricyclodecane diacrylate, propoxylated bisphenol A di(meth)acrylate, ethoxylated bisphenol A di(meth)acrylate, bisphenol F diacrylate, ethoxylated bisphenol F diacrylate, propoxylated bisphenol F diacrylate, cyclohexanedimethanol di(meth)acrylate, dimethyloldicyclopentane diacrylate, isocyanuric acid diacrylate, propoxylated isocyanuric acid diacrylate, trimethylolpropane triacrylate, hydroxypivalic acid trimethylolpropane triacrylate, ethoxylated phosphoric acid triacrylate, pentaerythritol triacrylate, tetramethylolpropane triacrylate, tetramethylolmethane triacrylate, caprolactone-modified trimethylolpropane triacrylate, propoxylate glyceryl triacrylate, trimethylolpropane oligoacrylate, ethoxylated trimethylolpropane triacrylate, propoxylated trimethylolpropane triacrylate, ethoxylated isocyanuric acid triacrylate, tri(2-hydroxyethyl isocyanurate) triacrylate, tri(meth)allyl isocyanurate, ethylene glycol di(meth)acrylate, diethylene glycol di(meth)acrylate, polyethylene glycol di(meth)acrylate, 1,6-hexanediol di(meth)acrylate, ethoxylated 1,6-hexanediol diacrylate, neopentyl glycol di(meth)acrylate, polypropylene glycol diacrylate, 1,4-butanediol di(meth)acrylate, tetraethylene glycol diacrylate, 2-n-butyl-2-ethyl-1,3-propanediol diacrylate, hydroxypivalic acid neopentyl glycol diacrylate, 1,3-butylene glycol di(meth)acrylate, trimethylolpropane triacrylate, hydroxypivalic acid trimethylolpropane triacrylate, ethoxylated phosphoric acid triacrylate, ethoxylated tripropylene glycol diacrylate, neopentyl glycol-modified trimethylolpropane diacrylate, stearic acid-modified pentaerythritol diacrylate, pentaerythritol triacrylate, tetramethylolpropane triacrylate, tetramethylolmethane triacrylate, pentaerythritol tetraacrylate, caprolactone-modified trimethylolpropane triacrylate, propoxylate glyceryl triacrylate, tetramethylolmethane tetraacrylate, pentaerythritol tetraacrylate, ditrimethylolpropane tetraacrylate, ethoxylated pentaerythritol tetraacrylate, dipentaerythritol hexaacrylate, caprolactone-modified dipentaerythritol hexaacrylate, dipentaerythritol hydroxypentaacrylate, neopentyl glycol oligoacrylate, 1,4-butanediol oligoacrylate, 1,6-hexanediol oligoacrylate, trimethylolpropane oligoacrylate, pentaerythritol oligoacrylate, ethoxylated neopentyl glycol di(meth)acrylate, propoxylated neopentyl glycol di(meth)acrylate, tripropylene glycol di(meth)acrylate, ethoxylated trimethylolpropane triacrylate, and propoxylated trimethylolpropane triacrylate. The bifunctional and polyfunctional monomers may be used singly, or two or more kinds may be used in combination, if necessary. It is preferable that the ink composition contain the bifunctional and/or polyfunctional monomers other than dipropylene glycol diacrylate and 1,9-nonanediol diacrylate, in an amount of 5% by weight to 60% by weight from the viewpoint of curability.

The ink composition may also contain a polymerizable monofunctional monomer. The polymerizable monofunctional monomer is preferably N-vinylcaprolactam, from the viewpoint of curability. The content of N-vinylcaprolactam in the ink composition is preferably 3% by weight to 40% by weight, and more preferably 10% by weight to 35% by weight. When the content of N-vinylcaprolactam is in the range described above, the ink composition exhibits excellent thick film curability.

Furthermore, the ink composition preferably contains isobornyl acrylate and/or lauryl acrylate as the polymerizable monofunctional monomer. The content of these monomers in the ink composition is preferably 3% by weight to 40% by weight, and more preferably 5% by weight to 25% by weight. Isobornyl acrylate and lauryl acrylate can easily spread on coated paper, and when the compounds are incorporated in an amount of 3% by weight to 40% by weight, the ink composition exhibits an enhanced effect of ink spread. Particularly, when the content of isobornyl acrylate and lauryl acrylate is 3% by weight or more, ink spread occurs sufficiently, and when the content is 40% by weight or less, curability is excellent.

In the ink composition, a monofunctional monomer other than N-vinylcaprolactam, isobornyl acrylate and lauryl acrylate may be used in combination, if necessary. Specific examples of such a monofunctional monomer include, but are not limited to, cyclohexyl acrylate, tetrahydrofurfuryl acrylate, 4-t-butylcyclohexyl acrylate, caprolactone-modified tetrahydrofurfuryl acrylate, t-butyl acrylate, isobutyl acrylate, isooctyl acrylate, isostearyl acrylate, stearyl acrylate, isoamyl acrylate, trimethylolpropane formal monoacrylate, trifluoroethyl acrylate, acryloylmorpholine, N-vinylpyrrolidone, hydroxyphenoxyethyl acrylate, hydroxyphenoxypropyl acrylate, 2-hydroxyethyl acrylate, 2-hydroxypropyl acrylate, 4-hydroxybutyl acrylate, 2-acryloyloxypropyl phthalate, β-carboxyethyl acrylate, benzyl acrylate, methylphenoxyethyl acrylate, 2-phenoxyethyl acrylate (or its ethylene oxide and/or propylene oxide adduct monomer), phenoxy diethylene glycol acrylate, 1,4-cyclohexanedimethanol monoacrylate, N-acryloyloxyethyl hexahydrophthalimide 2-methoxyethyl acrylate, methoxytriethylene glycol acrylate, 2-ethoxyethyl acrylate, 3-methoxybutyl acrylate, ethoxyethoxyethyl acrylate, butoxyethyl acrylate, methoxy dipropylene glycol acrylate, dipropylene glycol acrylate, ethoxylated succinic acid acrylate, and co-carboxypolycaprolactone monoacrylate.

Furthermore, these compounds may be used singly, or two or more kinds may be used in combination, if necessary. It is preferable that the ink composition contain these monofunctional monomers other than N-vinylcaprolactam, isobornyl acrylate and lauryl acrylate, in an amount of 5% by weight to 60% by weight according to the purpose, from the viewpoint of adhesiveness.

The ink composition may also use compounds so called as oligomers and/or prepolymers, in addition to the compounds described above. Specific examples thereof include "Ebecryl 230, 244, 245, 270, 280/15 IB, 284, 285, 4830, 4835, 4858, 4883, 8402, 8803, 8800, 254, 264, 265, 294/35 HD, 1259, 1264, 4866, 9260, 8210, 1290, 1290 K, 5129, 2000, 2001, 2002, 2100, KRM7222, KRM7735, 4842, 210, 215, 4827, 4849, 6700, 6700-20 T, 204, 205, 6602, 220, 4450, 770, IRR567, 81, 84, 83, 80, 657, 800, 805, 808, 810, 812, 1657, 1810, IRR302, 450, 670, 830, 835, 870, 1830, 1870, 2870, IRR267, 813, IRR483, 811, 436, 438, 446, 505, 524, 525, 554 W, 584, 586, 745, 767, 1701, 1755, 740/40 TP, 600, 601, 604, 605, 607, 608, 609, 600/25 TO, 616, 645, 648, 860, 1606, 1608, 1629, 1940, 2958, 2959, 3200, 3201, 3404, 3411, 3412, 3415, 3500, 3502, 3600, 3603, 3604, 3605, 3608, 3700, 3700-20H, 3700-20T, 3700-25R, 3701, 3701-20T, 3703, 3702, RDX63182, 6040, and IRR419", all manufactured by Daicel-UCB Co., Ltd.; "CN104, CN120, CN124, CN136, CN151, CN2270, CN2271E, CN435, CN454, CN970, CN971, CN972, CN9782, CN981, CN9893, and CN991", all manufactured by Sartomer Company, Inc.; "Laromer EA81, LR8713, LR8765, LR8986, PE56F, PE44F, LR8800, PE46T, LR8907, PO43F, PO77F, PE55F, LR8967, LR8981, LR8982, LR8992, LR9004, LR8956, LR8985, LR8987, UP35D, UA19T, LR9005, PO83F, PO33F, PO84F, PO94F, LR8863, LR8869, LR8889, LR8997, LR8996, LR9013, LR9019, PO9026V, and PE9027V", all manufactured by BASF SE; "Photomer 3005, 3015, 3016, 3072, 3982, 3215, 5010, 5429, 5430, 5432, 5662, 5806, 5930, 6008, 6010, 6019, 6184, 6210, 6217, 6230, 6891, 6892, 6893-20R, 6363, 6572, and 3660", all manufactured by Cognis Corp.; "Artresin UN-9000HP, 9000PEP, 9200A, 7600, 5200, 1003, 1255, 3320HA, 3320HB, 3320HC, 3320HS, 901T, 1200TPK, 6060PTM, and 6060P", all manufactured by Negami Chemical Industrial Co., Ltd.; "Shikoh UV-6630B, 7000B, 7510B, 7461TE, 3000B, 3200B, 3210EA, 3310B, 3500BA, 3520TL, 3700B, 6100B, 6640B, 1400B, 1700B, 6300B, 7550B, 7605B, 7610B, 7620EA, 7630B, 7640B, 2000B, 2010B, 2250EA, and 2750B", all manufactured by Nippon Synthetic Chemical Industry Co., Ltd.; and "Kayarad R-280, R-146, R131, R-205, EX2320, R190, R130, R-300, C-0011, TCR-1234, ZFR-1122, UX-2201, UX-2301, UX3204, UX-3301, UX-4101, UX-6101, UX-7101, MAX-5101, MAX-5100, MAX-3510, and UX-4101", all manufactured by Nippon Kayaku Co., Ltd. It is preferable that the ink composition contain the oligomers and prepolymers in an amount of 5% by weight to 30% by weight according to the purpose, from the viewpoints of adhesiveness and curability.

The ink composition may also contain an organic solvent in order to reduce the viscosity of the ink, and to enhance the wet spreadability of the ink on the base material.

Examples of the organic solvent include, but are not limited to, glycol monoacetates such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, ethylene glycol monomethyl ether propionate, ethylene glycol monoethyl ether propionate, ethylene glycol monobutyl ether propionate, diethyl diglycol, diethylene glycol dialkyl ether, tetraethylene glycol dialkyl ether, diethylene glycol monomethyl ether propionate, diethylene glycol monoethyl ether propionate, diethylene glycol monobutyl ether propionate, propylene glycol monomethyl ether propionate, dipropylene glycol monomethyl ether propionate, ethylene glycol monomethyl ether butyrate, ethylene glycol monoethyl ether butyrate, ethylene glycol monobutyl ether butyrate, diethylene glycol monomethyl ether butyrate, diethylene glycol monoethyl ether butyrate, diethylene glycol monobutyl ether butyrate, propylene glycol monomethyl ether butyrate, and dipropylene glycol monomethyl ether butyrate; glycol diacetates such as ethylene glycol diacetate, diethylene glycol diacetate, propylene glycol diacetate, dipropylene glycol diacetate, ethylene glycol acetate propionate, ethylene glycol acetate butyrate, ethylene glycol propionate butyrate, ethylene glycol dipropionate, ethylene glycol acetate dibutyrate, diethylene glycol acetate propionate, diethylene glycol acetate butyrate, diethylene glycol propionate butyrate, diethylene glycol dipropionate, diethylene glycol acetate dibutyrate, propylene glycol acetate propionate, propylene glycol acetate butyrate, propylene glycol propionate butyrate, propylene glycol dipropionate, propylene glycol acetate dibutyrate, dipropylene glycol acetate propionate, dipropylene glycol acetate butyrate, dipropylene glycol propionate butyrate, dipropylene glycol dipropionate, and dipropylene glycol acetate dibutyrate; glycols such as ethylene glycol, diethylene glycol, triethylene glycol, propylene glycol, and dipropylene glycol; glycol ethers such as ethylene glycol monobutyl ether, propylene glycol monomethyl ether, propylene glycol monobutyl ether, diethylene glycol monoethyl ether, diethylene glycol monobutyl ether, dipropylene glycol monomethyl ether, dipropylene glycol monoethyl ether, dipropylene glycol monobutyl ether, propylene glycol n-propyl ether, triethylene glycol monomethyl ether, triethylene glycol monoethyl ether, triethylene glycol monobutyl ether, and tripropylene glycol monomethyl ether; and lactic acid esters such as methyl lactate, ethyl lactate, propyl lactate, and butyl lactate. Among these, tetraethylene glycol dialkyl ether, ethylene glycol monobutyl ether acetate, and diethyl diglycol are preferred from the viewpoint of ejection stability. The organic solvent is preferably incorporated into the ink composition in an amount of 1% by weight to 10% by weight.

It is preferable that the ink composition contain a surface control agent in order to enhance wet spreadability of the ink composition on the base material. The surface control agent as used herein is a resin which lowers the ink surface tension by 0.5 mN/m or more when added to the ink in an amount of 1% by weight.

Examples of the surface control agent include silicone-based surface control agents and acrylic surface control agents, but it is preferable to use an acrylic surface control agent. Although the principle is not clearly understood, when an acrylic surface control agent is used, wet spreadability of the ink composition on coated paper in particular is improved.

There are surface control agents of various molecular weights, but compounds having a weight average molecular weight of 10,000 or less are preferred. When a surface control agent having a weight average molecular weight of 10,000 or less is used, excellent inkjet ejection properties are obtained.

Specific examples of the acrylic surface control agent include "BYK-350, 352, 354, 355, 358N, 361N, 381N, 381, and 392", all manufactured by BYK-Chemie GmbH, but the examples are not limited to these. The surface control agents may be used singly, or if necessary, two or more kinds may be used in combination.

The ink composition may also contain a surface control agent, if necessary, in addition to the acrylic surface control agent. Specific examples of the surface control agent include, but are not limited to, "BYK-300, 302, 306, 307, 310, 315, 320, 322, 323, 325, 330, 331, 333, 337, 340, 344, 370, 375, 377, 355, 356, 357, 390, UV3500, UV3510, and UV3570", all manufactured by BYK-Chemie GmbH; and "Tegorad-2100, 2200, 2250, 2500, and 2700", all manufactured by Evonik Tego Chemie GmbH. These surface control agents may be used singly, or if necessary, two or more kinds may be used in combination.

It is preferable that the ink composition contain the surface control agent in an amount of 0.001% to 5% by weight. When the content is 0.001% by weight or more, satisfactory wet spreadability is obtained, and when the content is 5% by weight, the surface control agent is satisfactorily oriented at the ink interface, and excellent effects are manifested.

The term active energy ray means an energy ray that is capable of affecting the electron orbital of an object to be irradiated and triggering polymerization reactions of radicals, cations, anions and the like, such as electron beam, ultraviolet radiation or infrared radiation. However, the active energy ray is not intended to be limited to these, as long as it is an energy ray capable of inducing a polymerization reaction.

The active energy ray curable inkjet ink composition is a liquid that can be printed or coated on the surface of a base material. If the ink composition does not contain any coloring component, the ink composition can be used for coating purpose. Furthermore, when the ink composition contains a coloring component, the ink composition can be used as a material for displaying graphics, characters, photographs, and the like.

Traditionally, dyes and pigments have been widely used as the coloring component, and particularly from the viewpoint of weather resistance, pigments are more frequently used. Examples of pigment components that can be used include, but are not limited to, achromatic pigments such as carbon black, titanium oxide and calcium carbonate; and chromatic organic pigments. Examples of the organic pigments include, but are not limited to, insoluble azo pigments such as toluidine red, toluidine maroon, Hansa yellow, benzidine yellow, and pyrazolone red; soluble azo pigments such as lithol red, Helio Bordeaux, pigment scarlet, and permanent red 2B; derivatives of vat dyes such as alizarin, indanthrone, and thioindigo maroon; phthalocyanine-based organic pigments such as phthalocyanine blue and phthalocyanine green; quinacridone-based organic pigments such as quinacridone red and quinacridone magenta; perylene-based organic pigments such as perylene red and perylene scarlet; isoindolinone-based organic pigments such as isoindolinone yellow and isoindolinone orange; pyranthrone-based organic pigments such as pyranthrone red and pyranthrone orange; thioindigo-based organic pigments; condensed azo-based organic pigments; benzimidazolone-based organic pigments; quinophthalone-based organic pigments such as quinophthalone yellow; isoindoline-based organic pigments such as isoindoline yellow; and other pigments such as flavanthrone yellow, acylamide yellow, nickel azo yellow, copper azomethine yellow, perinone orange, anthrone orange, dianthraquinonyl red, and dioxazine violet.

Examples of the organic pigments as indicated by their Color Index (C.I.) numbers include C.I. Pigment Yellow 12, 13, 14, 17, 20, 24, 74, 83, 86, 93, 109, 110, 117, 120, 125, 128, 129, 137, 138, 139, 147, 148, 150, 151, 153, 154, 155, 166, 168, 180, and 185; C.I. Pigment Orange 16, 36, 43, 51, 55, 59, and 61; C.I. Pigment Red 9, 48, 49, 52, 53, 57, 97, 122, 123, 149, 168, 177, 180, 192, 202, 206, 215, 216, 217, 220, 223, 224, 226, 227, 228, 238, and 240; C.I. Pigment Violet 19, 23, 29, 30, 37, 40, and 50; C.I. Pigment Blue 15, 15:1, 15:3, 15:4, 15:6, 22, 60, and 64; C.I. Pigment Green 7 and 36; and C.I. Pigment Brown 23, 25, and 26.

Specific examples of carbon black include "Special Black 350, 250, 100, 550, 5, 4, 4A, and 6", "Printex U, V, 140U, 140V, 95, 90, 85, 80, 75, 55, 45, 40, P, 60, L6, L, 300, 30, 3, 35, 25, A, and G", all manufactured by Degussa AG; "REGAL 400R, 660R, 330R, and 250R", "MOGUL E and L", all manufactured by Cabot Corp.; "MA 7, 8, 11, 77, 100, 100R, 100S, 220, and 230", "#2700, #2650, #2600, #200, #2350, #2300, #2200, #1000, #990, #980, #970, #960, #950, #900, #850, #750, #650, #52, #50, #47, #45, #45L, #44, #40, #33, #332, #30, #25, #20, #10, #5, CF9, #95, and #260", all manufactured by Mitsubishi Chemical Corp.

Specific examples of titanium oxide include "Tipaque CR-50, 50-2, 57, 80, 90, 93, 95, 953, 97, 60, 60-2, 63, 67, 58, 58-2, and 85", "Tipaque R-820, 830, 930, 550, 630, 680, 670, 580, 780, 780-2, 850, and 855", "Tipaque A-100 and 220", "Tipaque W-10", "Tipaque PF-740 and 744", "TTO-55(A), 55(B), 55(C), 55(D), 55(S), 55(N), 51(A), and 51(C) ", "TTO-S-1 and 2", "TTO-M-1 and 2", all manufactured by Ishihara Corp.; "Titanix JR-301, 403, 405, 600A, 605, 600E, 603, 805, 806, 701, 800, and 808", "Titanix JA-1, C, 3, 4, and 5", all manufactured by Tayca Corp.; and "Ti-pure R-900, 902, 960, 706, and 931", all manufactured by Du Pont Company.

Among the pigments listed above, quinacridone-based organic pigments, phthalocyanine-based organic pigments, benzimidazole-based organic pigments, isoindolinone-based organic pigments, condensed azo-based organic pigments, quinophthalone-based organic pigments, isoindoline-based organic pigments and the like are preferred because of their excellent light resistance. The organic pigment is preferably a finely powdered pigment having an average particle size of 10 to 150 nm as analyzed by laser scattering. When the average particle size of the pigment is 10 nm or larger, the pigment has excellent light resistance, and when the average particle size is 150 nm or less, the pigment can maintain excellent dispersion stability, while precipitation of the pigment does not occur.

Micronization of the organic pigment may be carried out by the method described below. That is, a mixture composed of at least three components such as an organic pigment, a water-soluble inorganic salt in an amount equivalent to 3 or more times the weight of the organic pigment, and a water-soluble solvent, is prepared as a clay-like mixture, the mixture is strongly kneaded with a kneader or the like to micronize the organic pigment, and then the resultant is introduced into water and stirred with a high-speed mixer or the like to obtain the mixture in a slurry form. Subsequently, filtration and washing of the slurry are repeated to remove the water-soluble inorganic salt and the water-soluble solvent. During the process of micronization, a resin, a pigment dispersant and the like may be added to the mixture.

Examples of the water-soluble inorganic salt include sodium chloride and potassium chloride. It is preferable to use these inorganic salts in an amount equivalent to 3 or more times, and preferably 20 or less times, the weight of the organic pigment. When the amount of the inorganic salt is 3 or more times the weight of the organic pigment, a treated pigment having a desired size may be obtained. Also, when the amount of the inorganic salt is 20 or less times the weight of the organic pigment, the washing treatment in the subsequent processes can be facilitated, and the substantial throughput of the organic pigment is increased.

The water-soluble solvent is used in order to make an appropriate clay-like state of the mixture of the organic pigment and the water-soluble inorganic salt used as a pulverization aid, and to efficiently carry out sufficient pulverization. There are no particular limitations on the solvent as long as the solvent is soluble in water. However, since the temperature of the system increases during the kneading process, and a condition is achieved such that the solvent is easily evaporated, a high boiling point solvent having a boiling point of 120° C. to 250° C. is preferred from the viewpoint of safety.

Examples of the water-soluble solvent include, but are not limited to, 2-(methoxymethoxy)ethanol, 2-butoxyethanol, 2-(isopentyloxy)ethanol, 2-(hexyloxy)ethanol, diethylene glycol, diethylene glycol monomethyl ether, diethylene glycol monoethyl ether, diethylene glycol monobutyl ether, triethylene glycol, triethylene glycol monomethyl ether, liquid polyethylene glycol, 1-methoxy-2-propanol, 1-ethoxy-2-propanol, dipropylene glycol, dipropylene glycol monomethyl ether, dipropylene glycol monoethyl ether, and low molecular weight polypropylene glycol.

The pigment is preferably incorporated in an amount of 0.1% to 30% by weight based on the ink composition, in order to obtain a sufficient concentration and sufficient light resistance.

It is preferable to add a pigment dispersant to the ink composition, in order to enhance dispersibility of the pigment and to enhance storage stability of the ink. Examples of the pigment dispersant that can be used include, but are not limited to, a hydroxyl group-containing carboxylic acid ester, a salt of a long-chain polyaminoamide and a high molecular weight acid ester, a salt of a high molecular weight polycarboxylic acid, a salt of a long-chain polyaminoamide and a polar acid ester, a high molecular weight unsaturated acid ester, a high molecular weight copolymer, a modified polyurethane, a modified polyacrylate, a polyether ester type anionic surfactant, a naphthalenesulfonic acid-formalin condensate salt, an aromatic sulfonic acid-formalin condensate salt, a polyoxyethylene alkyl phosphoric acid ester, polyoxyethylene nonyl phenyl ether, and stearylamine acetate.

Specific examples of the pigment dispersant include "Anti-Terra-U (polyaminoamide phosphate)", "Anti-Terra-203/204 (high molecular weight polycarboxylates)", "Disperbyk-101 (polyaminoamide phosphate and acid ester), 107 (hydroxyl group-containing carboxylic acid ester), 110, 111 (copolymers containing acid groups), 130 (polyamide), 161, 162, 163, 164, 165, 166, 170 (high molecular weight copolymers)", "400", "Bykumen" (high molecular weight unsaturated acid ester), "BYK-P104, P105 (high molecular weight unsaturated acid polycarboxylic acids)", "P104S, 240S (high molecular weight unsaturated acid polycarboxylic acid and silicone systems)", and "Lactimon (long-chain amine, unsaturated acid polycarboxylic acid and silicone)", all manufactured by BYK-Chemie GmbH.

Other examples include "Efka 44, 46, 47, 48, 49, 54, 63, 64, 65, 66, 71, 701, 764, and 766", "Efka Polymer 100 (modified polyacrylate), 150 (aliphatic-modifiedpolymer), 400, 401, 402, 403, 450, 451, 452, 453 (modified polyacrylates), and 745 (copper phthalocyanine-based)", all manufactured by Efka Chemicals B.V.; "Flowlen TG-710 (urethane oligomer)", "Flownon SH-290, SP-1000", and "Polyflow No. 50E, No. 300 (acrylic copolymer)", all manufactured by Kyoeisha Chemical Co., Ltd.; and "Disparlon KS-860, 873SN, 874 (polymeric dispersants), #2150 (aliphatic polyvalent carboxylic acid), #7004 (polyether ester type)", all manufactured by Kusumoto Chemicals, Ltd.

Still other examples include "Demol RN, N (naphthalenesulfonic acid-formalin condensate sodium salts), MS, C, SN-B (aromatic sulfonic acid-formalin condensate sodium salts), EP", "Homogenol L-18 (polycarboxylic acid type polymer)", "Emulgen 920, 930, 931, 935, 950, 985 (Polyoxyethylene nonyl phenyl ethers)", and "Acetamin 24 (coconut amine acetate), 86 (stearylamine acetate)", all manufactured by Kao Corp.; "Solsperse 5000 (phthalocyanine ammonium salt-based), 13940 (polyester amine-based), 17000 (fatty acid amine-based), 24000GR, 32000, 33000, 39000, 41000, and 53000", all manufactured by Lubrizol Corp.; "Nikkol T106 (polyoxyethylene sorbitan monooleate), MYS-IEX (polyoxyethylene monostearate), and Hexagline 4-0 (hexaglyceryl tetraoleate)", all manufactured by Nikko Chemicals Co., Ltd.; "Ajisper-PB821, 822, 824, 827 and 711", manufactured by Ajinomoto Fine Techno Co., Inc.; and "TEGO Disper 685" manufactured by Tego Chemie GmbH.

It is preferable that the pigment dispersant be contained in the ink composition in an amount of 0.01% to 10% by weight.

It is preferable that an acidic derivative of an organic pigment be incorporated into the ink composition at the time of dispersing the pigment, in order to further enhance the dispersibility of the pigment and the storage stability of the ink.

The ink composition contains [4-(methylphenylthio)phenyl]phenylmethanone as a photopolymerization initiator. Thereby, when ultraviolet radiation is used as the active energy ray, the ink composition exhibits excellent curability. [4-(Methylphenylthio)phenyl]phenylmethanone is a hydrogen-withdrawing type initiator, and is not easily subjected to oxygen inhibition. Therefore, particularly the curability of the highlighted area where the coverage rate is low is enhanced. Furthermore, as compared with other hydrogen-withdrawing type initiators such as benzophenone, [4-methylphenylthio]phenyl]phenylmethanone has less absorption in the region of 230 nm to 280 nm, and achieves a good balance between the surface curing and the internal curing of the ink, and therefore, curing defects such as surface wrinkles caused by excessive surface curing do not easily occur.

When ultraviolet radiation is used as the active energy ray, a photoradical polymerization initiator is incorporated into the ink composition. It is preferable that [4-(methylphenylthio)phenyl]phenylmethanone be incorporated into the ink composition as a photoradical polymerization initiator at a proportion of 1% by weight to 10% by weight, and more preferably 1% by weight to 5% by weight. When the content is 1% by weight or greater, the ink composition exhibits excellent curability, and the content is preferably 10% by weight or less.

The ink composition can also contain another photopolymerization initiator, if necessary, in addition to the photoradical initiator described above. Specific examples of the other photopolymerization initiator that can be suitably used include benzoin isobutyl ether, 2,4-diethylthioxanthone, 2-isopropylthioxanthone, benzil, 2,4,6-trimethylbenzoyl-diphenylphosphine oxide, 2-benzyl-2-dimethylamino-1-(4-morpholinophenyl)-butane-1-one, bis(2,4,6-dimethoxybenzoyl)-2,4,4-trimethylpentylphosphine oxide, 1,2-octanedione, 1-(4-(phenylthio)-2,2-(O-benzoyloxime)), and oligo(2-hydroxy-2-methyl-1-(4-(1-methylvinyl)phenyl)propane. In addition to these compounds, the ink composition may also use molecular cleavage type photopolymerization initiators such as 1-hydroxycyclohexyl phenyl ketone, benzoin ethyl ether, benzyl dimethyl ketal, 2-hydroxy-2-methyl-1-phenylpropane-1-one, 1-(4-isopropylphenyl)-2-hydroxy-2-methylpropane-1-one, and 2-methyl-1-(4-methylthiophenyl)-2-morpholinopropane-1-one in combination, and may also use hydrogen-withdrawing type photopolymerization initiators such as benzophenone, 4-phenylbenzophenone, isophthalphenone, and 4-benzoyl-4'-methyl-diphenyl sulfide in combination. These polymerization initiators are only exemplary, and the present invention is not intended to be limited to these.

The ink composition may also contain a sensitizer. The sensitizer is preferably ethyl-4-dimethylaminobenzoate. Ethyl-4-dimethylaminobenzoate can enhance the curability of the ink when used in combination with a hydrogen-withdrawing type photopolymerization initiator. Since ethyl-4-dimethylaminobenzoate has less absorption in the region of 230 nm to 280 nm and achieves a good balance between the surface curing and the internal curing of the ink, as compared with other sensitizers such as thioxanthone, curing defects such as surface wrinkles caused by excessive surface curing do not easily occur.

Furthermore, it is preferable that the ink composition contain ethyl-4-dimethylaminobenzoate based on [4-(methylphenylthio)phenyl]phenylmethanone at a ratio (weight ratio) of [4-(methylphenylthio)phenyl]phenylmethanone:ethyl-4-dimethylaminobenzoate=1:0.1 to 1:5, from the viewpoint of curability. When the content of ethyl-4-dimethylaminobenzoate is 10% or more based on [4-(methylphenylthio) phenyl]phenylmethanone, sufficient effects may be obtained; however, even if the content is greater than 500%, the effect does not improve any more.

As a sensitizer other than ethyl-4-dimethylaminobenzoate, for example, an amine that does not cause an addition reaction with the polymerizable components, such as trimethylamine, methyldimethanolamine, triethanolamine, p-diethylaminoacetophenone, ethyl p-dimethylaminobenzoate, isoamyl p-dimethylaminobenzoate, N,N-dimethylbenzylamine, and 4,4'-bis(diethylamino)benzophenone, may also be used in combination. Definitely, in regard to the photoradical polymerization initiator or the sensitizer, it is preferable to select and use a compound which has excellent solubility in ultraviolet-curable compounds and does not inhibit the ultraviolet transmission. The sensitizers are only exemplary, and the present invention is not intended to be limited to these.

It is preferable that the ink composition contain the photopolymerization initiator and the sensitizer in an amount of 2% to 25% by weight relative to the amount of the polymerizable monomers. When the content is 2% by weight or greater, the ink composition has an excellent curing rate, and when the content is 25% by weight or less, it is favorable in terms of economical efficiency, the ink composition does not have dissolution residues, and the ink composition is free from the problem of increase in ink viscosity and deterioration of the inkjet ejectability.

The ink composition may contain a polymerization inhibitor in order to increase the viscosity stability over time of the ink, the ejectability after a lapse of time, and the viscosity stability within a recording apparatus. The polymerization inhibitor is preferably phenothiazine. It is preferable that the ink composition contain phenothiazine in an amount of about 0.01% by weight to 2% by weight. When the content is 0.01% by weight or greater, sufficient effects are exhibited, and when the content is 2% by weight or less, an adequate effect of radical supplementation is obtained, so that curing occurs sufficiently.

Although the principle is not clearly understood, phenothiazine has excellent stability as compared with other polymerization inhibitors and thus exhibits its effect even with a small amount. Particularly, phenothiazine significantly improves the problem of viscosity stability over time, which is caused by the presence of vinyl monomers in the ink composition, and has an effect of preventing ejection defects after a lapse of time.

As a polymerization inhibitor other than phenothiazine, polymerization inhibitors such as hydroquinone, p-methoxyphenol, t-butylcatechol, pyrogallol, and butylhydroxytoluene can be used, if necessary, and these compounds may be used singly or in combination of two or more kinds. It is preferable to incorporate such a polymerization inhibitor into the inkjet ink composition in an amount of 0.01% to 5% by weight.

There are no particular limitations on the method for preparing the ink composition. For example, first, a pigment is micronized by the method described above, and then the micronized pigment is stirred and dispersed together with a pigment dispersant and a portion of monomers to thereby prepare a pigment dispersion. Stirring can be carried out using, for example, a mixer, a disper or the like. Dispersion can be carried out using a bead mill, a sand mill or the like. Subsequently, the pigment dispersion thus obtained is stirred and mixed with photopolymerization initiators including [4-(methylphenylthio)phenyl]phenylmethanone, the remaining portion of monomers, and if necessary, additives (a surface control agent and the like), and thus an ink composition can be prepared. Stirring and mixing can be carried out using a disper or the like. The ink composition thus prepared is used as an inkjet ink to perform printing on coated paper using an inkjet printer, and if necessary, the ink composition is heated and cured. Thus, printing products can be obtained (images or films).

Examples of the coated paper include all of a wide variety of coated papers that have been conventionally used in various applications. Specific examples include lightly coated paper, lightweight coated paper, coated paper, art paper, matt coated paper, and cast coated paper, and there are no particular limitations on the thickness or shape of these papers.

The coated paper is preferably subjected to a surface modification treatment as necessary. Preferred examples of the surface modification treatment include a corona treatment, a frame treatment, and a plasma treatment. Among them, it is preferable to use a corona treatment, in view of the extent of damage to the base material, and the handleability of the apparatus.

The amount of corona treatment used in the surface modification is desirably set in the range of from 20 $W \cdot min/m^2$ to 1000 $W \cdot min/m^2$, from the viewpoints of the surface treatment effect and the damage of the base material. The amount of corona treatment is more preferably from 50 $W \cdot min/m^2$ to 500 $W \cdot in/m^2$.

When the amount of treatment is 20 $W \cdot min/m^2$, sufficient effects are obtained; however, even if the amount of treatment exceeds 1000 $W \cdot min/m^2$, oxidation at the surface of the base material is saturated, and the state of wetting does not change any more. When the irradiation is carried out to an excessive degree, severe damage occurs to the base material, and deterioration of the base material occurs. Also, the roughness of the surface becomes so significant that perfectly circular dots are not easily obtained.

The heating temperature of the printing base material is preferably 40° C. or higher. When the printing base material is heated to a temperature of 40° C. or higher, the polymerization reaction of acrylate is accelerated by heat, and the curability of the ink is improved as compared with the case of performing printing at room temperature of 25° C.

EXAMPLES

Hereinafter, the present invention will be described in more detail by way of Examples, but the present invention is not intended to be limited in the scope by the following Examples. In addition, the term "parts" as used in the Examples represents "parts by weight."

| <Preparation of pigment dispersion A> | |
|---|---|
| Pigment Special Black 350 (carbon black pigment manufactured by Degussa AG) | 30.0 parts |
| Pigment dispersant Solsperse 32000 (manufactured by Lubrizol Corp.) | 6.0 parts |
| Monomer 2-Phenoxyethyl acrylate | 64.0 parts |

The above materials were stirred together with a high speed mixer or the like until a uniform state was obtained, and then the mill base thus obtained was dispersed for about one hour with a horizontal sand mill to prepare the pigment dispersion.

| <Preparation of pigment dispersion B> | |
|---|---|
| Pigment LIONEL BLUE FG-7400G (phthalocyanine pigment manufactured by Toyo Ink Mfg. Co., Ltd.) | 30.0 parts |
| Pigment dispersant Solsperse 32000 (manufactured by Lubrizol Corp.) | 9.0 parts |
| Monomer 2-Phenoxyethyl acrylate | 61.0 parts |

Examples 1 to 12

The materials of each of the mixing formulations of Table 1 were sequentially added under stirring in the order from the material indicated at the top of the table, and the mixture was gently mixed until the resin and the polymerization initiator were dissolved. The mixture was filtered through a 1-μm membrane filter to remove coarse particles, and thus an inkjet ink composition was obtained.

The ink raw materials in Table 1 used to prepare the inkjet ink compositions include the following:

DPGDA: Dipropylene glycol diacrylate
1,9-NDDA: 1,9-Nonanediol diacrylate
1,6-HDDA: 1,6-Hexanediol diacrylate
TPGDA: Tripropylene glycol diacrylate
PEA: 2-Phenoxyethyl acrylate
NVC: N-vinylcaprolactam
LA: Lauryl acrylate
IBXA: Isobornyl acrylate
Irg819: Irgacure 819 (manufactured by Ciba Specialty Chemicals Corp.)
TPO: DAROCUR TPO (manufactured by Ciba Specialty Chemicals Corp.)
Irg369: Irgacure 369 (manufactured by Ciba Specialty Chemicals Corp.)
EsaOne: Esacure One (manufactured by Nihon Siber Hegner K.K.) (manufactured by Nippon Kayaku Co., Ltd.)
BMS: KAYACURE BMS
 [4-(methylphenylthio)phenyl]phenylmethanone (manufactured by Nippon Kayaku Co., Ltd.)
EPA: KAYACURE EPA
 Ethyl-4-dimethylaminobenzoate (manufactured by Nippon Kayaku Co., Ltd.)
Benzophenone: KAYACURE BP-100 (manufactured by Nippon Kayaku Co., Ltd.)
DETX: KAYACURE DETX-S (manufactured by Nippon Kayaku Co., Ltd.)
BYK-UV3510: Silicone resin manufactured by BYK-Chemie GmbH
BYK-352: Acrylic resin manufactured by BYK-Chemie GmbH
BYK-361N: Acrylic resin manufactured by BYK-Chemie GmbH
BHT: BHT Swanox (manufactured by Seiko Chemical Co., Ltd.)
Phenothiazine: Phenothiazine (manufactured by Seiko Chemical Co., Ltd.)

Subsequently, this inkjet ink composition was used to perform ejection on various base materials such as coated paper, art paper, matt coated paper, and cast coated paper, for which the surface treatment conditions had been changed, using an inkjet ejection apparatus with multiple Kyocera heads (inkjet ejection apparatus with multiple Kyocera heads, product name: ONE PASS JET, manufactured by Tritek Co., Ltd.), under the printing conditions of an ink droplet volume of 14 pl and 600×600 dpi. After the ejection, the inkjet ink composition was subjected to UV curing using a single metal halide lamp manufactured by Harison Toshiba Lighting Corp. under the conditions of 120 W/cm, a conveyor speed of 25 m/min., and a single pass, and thus a film was obtained.

Coated paper: OK Overcoat+manufactured by Oji Paper Co., Ltd.
Art paper: Art E PW8R manufactured by Lintec Corp.
Matt coated paper: N Matt 55 P22U8C manufactured by Ojitac Co., Ltd.
Cast coated paper: Gloss PZ-2 manufactured by Lintec Corp.

Examples 13 to 24

Inkjet ink compositions were prepared according to the mixing formulations of Table 2 in the same manner as in Examples 1 to 12, and printing and curing were carried out.

In regard to the surface modification treatment of Examples 16 and 17, a corona treatment was carried out using a corona treating system, Multidyne 1, manufactured by Navitas Co., Ltd. at an output of 800 W, and using a flame treating system, B1-100, manufactured by Arcotec GmbH, at a distance between electrodes of 5 mm, while the throughput was regulated by changing the speed.

In regard to the base material temperature of Examples 18 and 19, heating was carried out using a hot plate (EHP-250 manufactured by As One Corp.), and when the surface temperature of the base material reached the temperature indicated in Table 2 (45° C., 60° C.), a printing test was carried out.

Comparative Examples 1 to 6

Inkjet ink compositions were prepared according to the mixing formulations indicated in Table 3 in the same manner as in Examples 1 to 12 and Examples 13 to 24, and printing and curing was carried out.

These films and inkjet ink compositions were subjected to the following evaluations.

<Dot Spread>

An area with a coverage rate of 10% in a printed material was observed under an optical microscope, and the diameter of one dot was measured. The evaluation criteria were as described below, and the grade ○ or higher was defined to have satisfactory spreadability.

The dot diameter being 95 μm or larger: ⊙
The dot diameter being 95 to 85 μm: ○
The dot diameter being 85 μm or less: x <High Coverage Rate Curability>

The degree of curability was determined at a printing rate at which a 100% solid printed area was cured by a single pass. The printed material was examined by touching, and the state in which the ink did not stick to the hand was determined as a cured state. The evaluation criteria were as described below, and the grade ○ or higher was defined to have satisfactory high coverage rate curability.

The ink cures at a printing rate of 50 m/min: ⊙
The ink cures at a printing rate of 25 m/min: ○
The ink does not cure at a printing rate of 25 m/min: x <Determination of Surface Wrinkles>

A 100% solid printed area was cured at a printing rate of 25 m/min by a single pass, and it was determined, by visual inspection, whether surface wrinkles due to excessive surface curing occurred at the surface of the printed material. The evaluation criteria were as described below, and the grade ○ or higher was defined to have satisfactory surface wrinkles.

Wrinkles do not occur at the surface of the printed material: ○
Wrinkles occur at the surface of the printed material: x <Low Coverage Rate Curability>

The degree of curability was determined at a printing rate at which an area with a coverage rate of 10% was cured by a single pass. The printed material was examined by touching, and the state in which the ink did not stick to the hand was determined as a cured state. The evaluation criteria were as described below, and the grade ○ or higher was defined to have satisfactory low coverage rate curability.

The ink cures at a printing rate of 50 m/min: ⊙
The ink cures at a printing rate of 25 m/min: ○
The ink does not cure at a printing rate of 25 m/min: x <Adhesiveness>

An adhesiveness test was carried out using a Cellophane adhesive tape. The test was carried out by attaching a Cellophane adhesive tape to a film obtained after 100% solid printing and curing, rubbing the surface with an eraser to secure sufficient adhesion of the Cellophane adhesive tape to the coated surface, and then peeling the Cellophane adhesive tape at 90°. The adhesiveness was determined from the degree of adhesion of the film to the base material after the peeling of the Cellophane adhesive tape. The evaluation criteria were as described below, and the grade ⊙ or higher was defined to have satisfactory adhesiveness.

No peeling is observed, or the adhesive tape and the base material are peeled together: ⊙

Peeling occurs from the base material in an amount of equal to or more than 1% and less than 25%: ○

Peeling occurs from the base material in an amount of equal to or more than 25%: x <Ejection Stability>

The ejection stability is also related to the storage stability of the ink. That is, when the storage stability of the ink is poor, the ink viscosity increases, the ejection rate is decreased, and ejection failure and flight deflection occur. Therefore, ejection does not occur stably.

The inkjet ink composition prepared as described above was left to stand for 3 days at 70° C., and a nozzle check pattern was printed with an inkjet ejection apparatus with multiple Kyocera heads under the same conditions as the conditions used before the time lapse. Thus, ejection stability was evaluated. The evaluation criteria were as described below, and the grade ○ or higher was defined to have satisfactory ejection stability.

Same ejectability as before the time lapse: ○

Flight deflection or ejection failure occurs in 1 to 5 nozzles after the time lapse, as compared with before the time lapse: Δ

Flight deflection or ejection failure occurs in 6 or more nozzles after the time lapse, as compared with before the time lapse: x The printing conditions and the test results of Examples 1 to 12 are presented in Table 1, and the printing conditions and the test results of Examples 13 to 24 are presented in Table 2. In Examples 1 to 24, each of the ink compositions contained dipropylene glycol diacrylate and/or 1,9-nonanediol diacrylate in an amount of 15% by weight to 75% by weight, and [4-(methylphenylthio)phenyl]phenylmethanone as a photopolymerization initiator in an amount of 1% by weight to 10% by weight. Thus, the ink compositions exhibited satisfactory dot spreadability, curability, and ejection stability. Therefore, active energy ray curable inkjet ink compositions which have excellent storage stability and satisfactory inkjet ejection stability, form satisfactory images on coated paper, and exhibit excellent curability were obtained.

In Examples 2, 4, 6, 7, and 18 to 23, the ink compositions contain dipropylene glycol diacrylate and/or 1,9-nonanediol diacrylate in an amount of 30% by weight or more, and thus exhibit more satisfactory dot spread as compared with Example 1.

In Examples 1, 3, 5 to 17, and 20 to 24, the ink compositions contained dipropylene glycol diacrylate and/or 1,9-nonanediol diacrylate in an amount of 60% by weight or less, and thus exhibit more satisfactory adhesiveness as compared with Example 2.

In Examples 1, 3, 6, 8, 9, 11 to 17, 20 to 22, and 24, the ink compositions contain N-vinylcaprolactam in an amount of from 3% by weight to 40% by weight, and thus exhibit more satisfactory high coverage rate curability as compared with Example 2 which does not contain N-vinylcaprolactam.

In Examples 8 to 12 and 24, the ink compositions contain isobornyl acrylate and/or lauryl acrylate in an amount of 3% by weight to 40% by weight, and thus exhibit more satisfactory dot spread as compared with Example 1 which contains neither isobornyl acrylate nor lauryl acrylate.

In Examples 13 to 15, the ink compositions contain an acrylic surface control agent as a surface control agent, and thus exhibit more satisfactory dot spread as compared with Example 1.

In Examples 3, 4, 6 and 7, the ink compositions contain ethyl-4-dimethylaminobenzoate as a sensitizer based on [4-(methylphenylthio)phenyl]phenylmethanone at a rate of [4-(methylphenylthio)phenyl]phenylmethanone:ethyl-4-dimethylaminobenzoate=1:0.1 to 1:5, and thus exhibit more satisfactory low coverage rate curability as compared with Example 1.

In Examples 16 and 17, the base materials are subjected to a corona treatment, and thus the ink compositions exhibit more satisfactory dot spread as compared with Example 1.

In Examples 18 and 19, the base materials are heated to 40° C., and thus the ink compositions exhibit more satisfactory high coverage rate curability and low coverage rate curability as compared with Example 2.

In Examples 1 to 24, the ink compositions contain phenothiazine as a polymerization inhibitor, and thus exhibit excellent ejection stability.

In Examples 20 and 21, the ink compositions contain dipropylene glycol diacrylate in an amount of from 30% by weight to 60% by weight, and contain NVC in an amount of from 3% by weight to 40% by weight, and thus exhibit more satisfactory adhesion and thick film curabilities as compared with Example 2.

In Examples 22 and 23, the ink compositions contain 1,9-nonanediol diacrylate in an amount of from 30% by weight to 60% by weight, and thus exhibit improved adhesiveness as compared with Example 3.

In Example 24, the ink composition contains lauryl acrylate, and thus exhibits satisfactory dot spread as compared with Example 1.

The printing conditions and the test results of Comparative Example 1 to Comparative Example 6 are presented in Table 3. In Comparative Examples 1 and 4 to 6, the ink compositions contain dipropylene glycol diacrylate and/or 1,9-nonanediol diacrylate in the ink in an amount of less than 15% by weight, and thus exhibit poor spreadability. Furthermore, the ink composition of Comparative Example 2 contains dipropylene glycol diacrylate in an amount of greater than 75% by weight, and thus exhibits poor adhesiveness.

In Comparative Examples 1, 3, 5 and 6, the ink compositions do not contain [4-(methylphenylthio)phenyl]phenylmethanone, and thus exhibit poor low coverage rate curability. Furthermore, the ink composition of Comparative example 4 contains a hydrogen-withdrawing type initiator other than [4-(methylphenylthio)phenyl]phenylmethanone, and thus exhibits satisfactory low coverage rate curability, but surface wrinkles have occurred.

In Comparative Examples 1 to 5, the ink compositions do not contain phenothiazine as a polymerization initiator, and exhibit poor ejection stability. Particularly, the ink compositions of Comparative Examples 3 to 5 containing N-vinylcaprolactam exhibit markedly poor ejection stability.

TABLE 1

|  |  | Example | | | | | |
|---|---|---|---|---|---|---|---|
|  |  | 1 | 2 | 3 | 4 | 5 | 6 |
| Pigment dispersion | A | 15 |  |  | 15 | 15 |  |
|  | B |  | 15 | 15 |  |  | 15 |
| Bifunctional | DPGDA | 20.0 | 70.0 |  |  | 10.0 | 35.0 |
|  | 1,9-NDDA |  |  | 20 | 65 | 10 |  |
|  | 1,6-HDDA |  |  |  |  |  |  |
|  | TPGDA |  |  |  |  |  |  |
| Monofunctional | PEA | 19.0 | 4.0 | 39.1 |  | 53.6 | 11.0 |
|  | NVC | 35.0 |  | 5.0 |  |  | 35.0 |
|  | LA |  |  |  |  |  |  |
|  | IBXA |  |  |  |  |  |  |
| Initiator | Irg819 | 2.0 | 2.0 | 2.0 | 2.0 | 2.0 | 2.0 |
|  | TPO | 2.0 | 2.0 | 2.0 | 2.0 | 2.0 | 2.0 |
|  | Irg369 | 2.0 | 2.0 | 2.0 | 2.0 | 2.0 | 2.0 |
|  | EsaOne | 2.0 | 2.0 | 2.0 | 2.0 | 2.0 | 2.0 |
|  | BMS | 2.0 | 2.0 | 6.4 | 2.0 | 2.0 | 9.0 |
|  | EPA |  |  | 4 | 9 |  | 1 |
|  | Benzophenone |  |  |  |  |  |  |
|  | DETX |  |  |  |  |  |  |
| Surface control agent | BYK-UV3510 | 0.1 | 0.1 | 1 | 0.1 | 0.5 | 0.1 |
|  | BYK-352 |  |  |  |  |  |  |
|  | BYK-361N |  |  |  |  |  |  |
| Inhibitor | BHT | 0.5 | 0.5 | 0.5 | 0.87 | 0.5 | 0.5 |
|  | Phenothiazine | 0.4 | 0.4 | 1 | 0.03 | 0.4 | 0.4 |
| Printing base material |  | Coated paper | Art paper | Matt coated paper | Coated paper | Cast coated paper | Art paper |
| Surface modification treatment (W·min/m$^2$) |  | None | None | None | None | None | None |
| Base material temperature |  | 25° C. | 25° C. | 25° C. | 25° C. | 25° C. | 25° C. |
| Dot spread |  | ○ | ⊙ | ○ | ⊙ | ○ | ⊙ |
| High coverage rate curability |  | ⊙ | ○ | ⊙ | ○ | ⊙ | ⊙ |
| Surface wrinkles |  | ○ | ○ | ○ | ○ | ○ | ○ |
| Low coverage rate curability |  | ○ | ○ | ⊙ | ⊙ | ○ | ⊙ |
| Adhesiveness |  | ⊙ | ○ | ⊙ | ○ | ⊙ | ⊙ |
| Ejection stability |  | ○ | ○ | ○ | ○ | ○ | ○ |

|  |  | Example | | | | | |
|---|---|---|---|---|---|---|---|
|  |  | 7 | 8 | 9 | 10 | 11 | 12 |
| Pigment dispersion | A | 15 | 15 | 15 | 15 | 15 | 15 |
|  | B |  |  |  |  |  |  |
| Bifunctional | DPGDA | 55.0 | 20.0 | 20.0 | 20.0 | 20.0 | 20.0 |
|  | 1,9-NDDA |  |  |  |  |  |  |
|  | 1,6-HDDA |  |  |  |  |  |  |
|  | TPGDA |  |  |  |  |  |  |
| Monofunctional | PEA | 11.0 | 19.0 | 19.0 | 18.0 | 9.0 | 28.0 |
|  | NVC |  | 30.0 | 30.0 |  | 20.0 | 20.0 |
|  | LA |  | 5 |  | 35 |  | 3 |
|  | IBXA |  |  | 5 |  | 25 | 3 |
| Initiator | Irg819 | 2.0 | 2.0 | 2.0 | 2.0 | 2.0 | 2.0 |
|  | TPO | 2.0 | 2.0 | 2.0 | 2.0 | 2.0 | 2.0 |
|  | Irg369 | 2.0 | 2.0 | 2.0 | 2.0 | 2.0 | 2.0 |
|  | EsaOne | 2.0 | 2.0 | 2.0 | 2.0 | 2.0 | 2.0 |
|  | BMS | 2.0 | 2.0 | 2.0 | 3.0 | 2.0 | 2.0 |
|  | EPA | 2 |  |  |  |  |  |
|  | Benzophenone |  |  |  |  |  |  |
|  | DETX |  |  |  |  |  |  |
| Surface control agent | BYK-UV3510 | 0.1 | 0.1 | 0.1 | 0.1 | 0.1 | 0.1 |
|  | BYK-352 |  |  |  |  |  |  |
|  | BYK-361N |  |  |  |  |  |  |
| Inhibitor | BHT | 0.5 | 0.5 | 0.5 | 0.5 | 0.5 | 0.5 |
|  | Phenothiazine | 0.4 | 0.4 | 0.4 | 0.4 | 0.4 | 0.4 |
| Printing base material |  | Matt coated paper | Coated paper | Coated paper | Cast coated paper | Coated paper | Art paper |
| Surface modification treatment (W·min/m$^2$) |  | None | None | None | None | None | None |
| Base material temperature |  | 25° C. | 25° C. | 25° C. | 25° C. | 25° C. | 25° C. |
| Dot spread |  | ⊙ | ⊙ | ⊙ | ⊙ | ⊙ | ⊙ |
| High coverage rate curability |  | ○ | ⊙ | ○ | ○ | ○ | ○ |
| Surface wrinkles |  | ○ | ○ | ○ | ○ | ○ | ○ |
| Low coverage rate curability |  | ⊙ | ○ | ○ | ⊙ | ○ | ⊙ |
| Adhesiveness |  | ⊙ | ⊙ | ⊙ | ⊙ | ⊙ | ⊙ |
| Ejection stability |  | ○ | ○ | ○ | ○ | ○ | ○ |

TABLE 2

|  |  | Example | | | | | |
|---|---|---|---|---|---|---|---|
|  |  | 13 | 14 | 15 | 16 | 17 | 18 |
| Pigment dispersion | A | 15 | 15 | 15 | 15 | 15 |  |
|  | B |  |  |  |  |  | 15 |
| Bifunctional | DPGDA | 20.0 | 20.0 | 20.0 | 20.0 | 20.0 | 70.0 |
|  | 1,9-NDDA |  |  |  |  |  |  |
|  | 1,6-HDDA |  |  |  |  |  |  |
|  | TPGDA |  |  |  |  |  |  |
| Monofunctional | PEA | 19.0 | 19.0 | 18.1 | 19.0 | 19.0 | 4.0 |
|  | NVC | 35.0 | 35.0 | 35.0 | 35.0 | 35.0 |  |
|  | LA |  |  |  |  |  |  |
|  | IBXA |  |  |  |  |  |  |
| Initiator | 819 | 2.0 | 2.0 | 2.0 | 2.0 | 2.0 | 2.0 |
|  | TPO | 2.0 | 2.0 | 2.0 | 2.0 | 2.0 | 2.0 |
|  | 369 | 2.0 | 2.0 | 2.0 | 2.0 | 2.0 | 2.0 |
|  | EsaOne | 2.0 | 2.0 | 2.0 | 2.0 | 2.0 | 2.0 |
|  | BMS | 2.0 | 2.0 | 2.0 | 2.0 | 2.0 | 2.0 |
|  | EPA |  |  |  |  |  |  |
|  | Benzophenone |  |  |  |  |  |  |
|  | DETX |  |  |  |  |  |  |
| Surface control agent | BYK-UV3510 |  |  |  | 0.1 | 0.1 | 0.1 |
|  | 352 | 0.1 |  |  |  |  |  |
|  | 361N |  | 0.1 | 1 |  |  |  |
| Inhibitor | BHT | 0.5 | 0.5 | 0.5 | 0.5 | 0.5 | 0.5 |
|  | Phenothiazine | 0.4 | 0.4 | 0.4 | 0.4 | 0.4 | 0.4 |
| Printing base material |  | Coated paper | Coated paper | Coated paper | Coated paper | Coated paper | Art paper |
| Surface modification treatment (W · min/m$^2$) |  | None | None | None | 60 | 450 | None |
| Base material temperature |  | 25° C. | 25° C. | 25° C. | 25° C. | 25° C. | 45° C. |
| Dot spread |  | ⊙ | ⊙ | ⊙ | ⊙ | ⊙ | ⊙ |
| High coverage rate curability |  | ⊙ | ⊙ | ⊙ | ⊙ | ⊙ | ⊙ |
| Surface wrinkles |  | ○ | ○ | ○ | ○ | ○ | ○ |
| Low coverage rate curability |  | ○ | ○ | ○ | ○ | ○ | ⊙ |
| Adhesiveness |  | ⊙ | ⊙ | ⊙ | ⊙ | ⊙ | ○ |
| Ejection stability |  | ○ | ○ | ○ | ○ | ○ | ○ |

|  |  | Example | | | | | |
|---|---|---|---|---|---|---|---|
|  |  | 19 | 20 | 21 | 22 | 23 | 24 |
| Pigment dispersion | A |  |  |  |  |  | 15 |
|  | B | 15 | 15 | 15 | 15 | 15 |  |
| Bifunctional | DPGDA | 70.0 | 35.0 | 55.0 |  |  | 20.0 |
|  | 1,9-NDDA |  |  |  |  |  |  |
|  | 1,6-HDDA |  |  |  |  |  |  |
|  | TPGDA |  |  |  | 35 | 55 |  |
| Monofunctional | PEA | 4.0 | 4.0 | 14.0 | 19.1 | 9.1 | 9.0 |
|  | NVC |  | 35.0 | 5.0 | 10.0 |  | 10.0 |
|  | LA |  |  |  |  |  | 35 |
|  | IBXA |  |  |  |  |  |  |
| Initiator | 819 | 2.0 | 2.0 | 2.0 | 2.0 | 2.0 | 2.0 |
|  | TPO | 2.0 | 2.0 | 2.0 | 2.0 | 2.0 | 2.0 |
|  | 369 | 2.0 | 2.0 | 2.0 | 2.0 | 2.0 | 2.0 |
|  | EsaOne | 2.0 | 2.0 | 2.0 | 2.0 | 2.0 | 2.0 |
|  | BMS | 2.0 | 2.0 | 2.0 | 6.4 | 6.4 | 2.0 |
|  | EPA |  |  |  | 4 | 4 |  |
|  | Benzophenone |  |  |  |  |  |  |
|  | DETX |  |  |  |  |  |  |
| Surface control agent | BYK-UV3510 | 0.1 | 0.1 | 0.1 | 1 | 1 | 0.1 |
|  | 352 |  |  |  |  |  |  |
|  | 361N |  |  |  |  |  |  |
| Inhibitor | BHT | 0.5 | 0.5 | 0.5 | 0.5 | 0.5 | 0.5 |
|  | Phenothiazine | 0.4 | 0.4 | 0.4 | 1 | 1 | 0.4 |
| Printing base material |  | Art paper | Art paper | Art paper | Matt coated paper | Matt coated paper | Coated paper |
| Surface modification treatment (W · min/m$^2$) |  | None | None | None | None | None | None |
| Base material temperature |  | 60° C. | 25° C. | 25° C. | 25° C. | 25° C. | 25° C. |
| Dot spread |  | ⊙ | ⊙ | ⊙ | ⊙ | ⊙ | ⊙ |
| High coverage rate curability |  | ⊙ | ⊙ | ⊙ | ⊙ | ○ | ⊙ |
| Surface wrinkles |  | ○ | ○ | ○ | ○ | ○ | ○ |
| Low coverage rate curability |  | ⊙ | ○ | ○ | ⊙ | ⊙ | ○ |
| Adhesiveness |  | ○ | ⊙ | ⊙ | ⊙ | ⊙ | ⊙ |
| Ejection stability |  | ○ | ○ | ○ | ○ | ○ | ○ |

TABLE 3

|  |  | Comparative Example ||||||
|---|---|---|---|---|---|---|---|
|  |  | 1 | 2 | 3 | 4 | 5 | 6 |
| Pigment dispersion | A | 15 |  |  | 15 | 15 | 15 |
|  | B |  |  | 15 |  |  |  |
| Bifunctional | DPGDA | 5.0 | 89.0 |  |  | 5.0 | 5.0 |
|  | 1,9-NDDA |  |  | 50 | 5 |  | 5 |
|  | 1,6-HDDA | 60 |  |  |  |  | 16 |
|  | TPGDA |  |  |  | 45 |  |  |
| Monofunctional | PEA | 11.0 |  | 4.0 | 2.0 | 43.0 |  |
|  | NVC |  |  | 20.0 | 20.0 | 20.0 | 20 |
|  | LA |  |  |  |  | 5 | 25 |
|  | IBXA |  |  |  |  |  |  |
| Initiator | 819 | 2.0 | 2.0 | 2.0 | 2.0 | 2.0 | 2.0 |
|  | TPO | 2.0 | 2.0 | 2.0 | 2.0 | 2.0 | 2.0 |
|  | 369 | 2.0 | 2.0 | 2.0 | 2.0 | 2.0 | 2.0 |
|  | EsaOne | 2.0 | 2.0 | 2.0 | 2.0 | 2.0 | 2.0 |
|  | EMS |  | 2.0 |  |  |  |  |
|  | EPA |  |  |  |  |  |  |
|  | Benzophenone |  |  |  | 2 |  |  |
|  | DETX |  |  |  |  | 3 | 5 |
| Surface contorol agent | BYK-UV3510 | 0.1 | 0.1 | 0.1 | 0.1 |  | 0.1 |
|  | 352 |  |  |  |  | 0.1 |  |
|  | 361N |  |  |  |  |  |  |
| Inhibitor | BHT | 0.9 | 0.9 | 0.9 | 0.9 | 0.9 | 0.8 |
|  | Phenothiazine |  |  |  |  |  | 0.1 |
| Printing base material |  | Coated paper | Art paper | Matt coated paper | Coated paper | Art paper | Coated paper |
| Surface modification treatment (W · min/m$^2$) |  | None | None | None | None | None | 250 |
| Base material temperature |  | 25° C. | 25° C. | 25° C. | 25° C. | 25° C. | 50° C. |
| Dot spread |  | X | ⊙ | ⊙ | X | X | X |
| High coverage rate curability |  | X | ○ | ○ | ○ | ○ | ⊙ |
| Surface wrinkles |  | X | ○ | ○ | X | X | X |
| Low coverage rate curability |  | X | ○ | X | ○ | X | X |
| Adhesiveness |  | ○ | X | ○ | X | ○ | ○ |
| Ejection stability |  | Δ | Δ | X | X | X | ○ |

The invention claimed is:

1. An active energy ray curable inkjet ink composition comprising:
   15% by weight to 75% by weight of at least one polymerizable bifunctional monomer selected from the group consisting of dipropylene glycol diacrylate and 1,9-nonanediol diacrylate; and
   1% by weight to 10% by weight of [4-(methylphenylthio)phenyl]phenylmethanone as a photopolymerization initiator.

2. The active energy ray curable inkjet ink composition according to claim 1, further comprising: 3% by weight to 40% by weight of N-vinylcaprolactam as a polymerizable monofunctional monomer.

3. The active energy ray curable inkjet ink composition according to claim 1, further comprising: 3% by weight to 40% by weight of at least one monomer selected from the group consisting of isobornyl acrylate and lauryl acrylate as a polymerizable monofunctional monomer.

4. The active energy ray curable inkjet ink composition according to claim 1, further comprising: an acrylic surface control agent as a surface control agent.

5. The active energy ray curable inkjet ink composition according to claim 1, further comprising:
   ethyl-4-dimethylaminobenzoate as a sensitizer based on [4-(methylphenylthio)phenyl]phenylmethanone at a weight ratio of [4-(methylphenylthio)phenyl]phenylmethanone:ethyl-4-dimethylaminobenzoate=1:0.1 to 1:5.

6. The active energy ray curable inkjet ink composition according to claim 1, further comprising: phenothiazine as a polymerization inhibitor.

* * * * *